US011903013B2

(12) United States Patent
Zhao

(10) Patent No.: US 11,903,013 B2
(45) Date of Patent: Feb. 13, 2024

(54) DIRECT COMMUNICATION RESOURCE ALLOCATION METHOD AND APPARATUS

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 218 days.

(21) Appl. No.: 17/290,236

(22) PCT Filed: Oct. 25, 2019

(86) PCT No.: PCT/CN2019/113184
§ 371 (c)(1),
(2) Date: Apr. 29, 2021

(87) PCT Pub. No.: WO2020/088355
PCT Pub. Date: May 7, 2020

(65) Prior Publication Data
US 2022/0022199 A1 Jan. 20, 2022

(30) Foreign Application Priority Data

Oct. 31, 2018 (CN) .......................... 201811291107.0
Jan. 21, 2019 (CN) .......................... 201910054760.3

(51) Int. Cl.
*H04W 72/04* (2023.01)
*H04W 4/20* (2018.01)
(Continued)

(52) U.S. Cl.
CPC ......... *H04W 72/543* (2023.01); *H04W 72/56* (2023.01)

(58) Field of Classification Search
CPC ............. H04W 72/23; H04W 28/0278; H04W 28/0263; H04W 72/04; H04W 76/14;
(Continued)

(56) References Cited

U.S. PATENT DOCUMENTS

2013/0272227 A1* 10/2013 Gallagher ............. H04W 16/02
370/329
2017/0048745 A1 2/2017 Yi et al.
(Continued)

FOREIGN PATENT DOCUMENTS

CN 104782223 A 7/2015
CN 105163346 A 12/2015
(Continued)

OTHER PUBLICATIONS

Ericsson,"Management of Sidelink logical channel groups", 3GPP TSG-RAN WG2 #91 bis, Malmö, Sweden, Oct. 5-9, 2015, total 2 pages, Tdoc R2-154154.

*Primary Examiner* — Khaled M Kassim
*Assistant Examiner* — Jason A Harley
(74) *Attorney, Agent, or Firm* — Kilpatrick Townsend & Stockton LLP

(57) ABSTRACT

Disclosed are a direct communication resource allocation method and apparatus. The method include receiving direct communication interface logical channel group configuration indication information sent by a resource allocation management node, and the direct communication interface logical channel group configuration indication information is used for indicating that logical channels using different wireless access technologies respectively correspond to different logical channel groups; and according to the direct communication interface logical channel group configuration indication information, determining a logical channel group corresponding to a direct communication interface logical channel. The present application can ensure that
(Continued)

resources allocated by a direct communication resource allocation node can match the wireless access technology selected by each logical channel on a direct communication interface of a terminal.

15 Claims, 5 Drawing Sheets

(51) Int. Cl.
*H04W 4/08* (2009.01)
*H04L 67/55* (2022.01)
*H04L 41/0893* (2022.01)
*H04W 76/15* (2018.01)
*H04W 72/543* (2023.01)
*H04W 72/56* (2023.01)

(58) Field of Classification Search
CPC . H04W 72/543; H04L 1/1887; H04B 7/15542
USPC ............. 370/395.42; 455/435.3, 456.5
See application file for complete search history.

(56) References Cited

U.S. PATENT DOCUMENTS

| | | | |
|---|---|---|---|
| 2019/0053215 A1* | 2/2019 | Yu | H04B 7/15542 |
| 2020/0084669 A1* | 3/2020 | Belleschi | H04W 72/1263 |

FOREIGN PATENT DOCUMENTS

| | | | |
|---|---|---|---|
| CN | 106454693 A | 2/2017 |
| CN | 107347215 A | 11/2017 |
| CN | 107534829 A | 1/2018 |
| CN | 107950047 4 | 4/2018 |
| CN | 111132317 A | 5/2020 |
| EP | 2723144 A1 | 4/2014 |
| EP | 3131364 A1 | 2/2017 |
| WO | 2016163762 A1 | 10/2016 |
| WO | 2020088355 A1 | 5/2020 |

* cited by examiner

DIRECT COMMUNICATION RESOURCE ALLOCATION METHOD AND APPARATUS

The application is a US National Stage of International Application No. PCT/CN2019/113184, filed Oct. 25, 2019, which claims priorities to Chinese Patent Application No. 201811291107.0 filed with the Chinese Patent Office on Oct. 31, 2018 and entitled "Direct Communication Resource Allocation Method and Apparatus" and Chinese Patent Application No. 201910054760.3 filed with the Chinese Patent Office on Jan. 21, 2019 and entitled "Direct Communication Resource Allocation Method and Apparatus", which are hereby incorporated by reference in their entirety.

FIELD

The application relates to the field of wireless communication technologies, and particularly to a sidelink communication resource allocation method and apparatus.

BACKGROUND

The sidelink communication is performed directly between User Equipments that are close to each other. As shown in FIG. 1, for ease of description, the communication link for sidelink between User Equipments is defined as Sidelink, and its corresponding wireless interface is called Sidelink interface; and the cellular communication link between the network and a sidelink communication user equipment is called Uu link, and its corresponding interface is called Uu interface.

The user equipment for sidelink communication may all in coverage or all out of coverage, or some user equipments may be in coverage and some user equipment may be out of coverage. The so-called in coverage means that the user equipments participating in the sidelink communication are located within the coverage of 3GPP sidelink communication carriers, and the so-called out of coverage means that the user equipments participating in the sidelink communication are not within the coverage of 3GPP sidelink communication carriers.

Typical sidelink communication scenarios include three types as follows.

1) Unicast communication.

That is, the one-to-one communication is performed among user equipments.

2) Multicast communication.

A user equipment can transmit the same data to all user equipments in a communication group at a time; when there is only one receiving user equipment in the communication group, the corresponding mode is unicast communication. The unicast communication can be regarded as a special case of multicast communication.

3) Broadcast communication.

A user equipment can transmit the same data to all nearby user equipments at a time, and the broadcast communication does not guarantee the reliability of communication.

Currently, the sidelink communication interface supports two resource allocation modes.

1) Resource allocation mode of network scheduling.

That is, it is a mode in which the network side allocates resources to a user equipment according to the Sidelink BSR (Buffer Status Reporting) reported by the user equipment.

2) Resource allocation mode of user equipment self-selection.

That is, a user equipment itself selects a resource from the pre-configured or network-broadcast transmission resources to perform the data transmission of the sidelink.

For the sidelink interface, if the user equipment is in coverage, the resources used by the sidelink communication interface thereof are controlled by the network device whether the resource allocation mode of network scheduling or the resource allocation mode of user equipment self-selection is used, and the network device controls the resource pool allocated for the communication interface (corresponding to the resource allocation mode of user equipment self-selection) or specific resources (corresponding to the resource allocation mode of network scheduling) through the Uu interface. Therefore, they are collectively referred to as the resource allocation based on Uu interface.

In the 5G system, for the user equipments that support the sidelink communication, the capabilities on the sidelink communication interface are also different. Some user equipments only support the LTE (Long Term Evolution) wireless access technology on the sidelink interface, some user equipments only support the NR (New Radio) wireless access technology on the sidelink interface, and some user equipments can support both the LTE wireless access technology and the NR wireless access technology on the sidelink interface. For a user equipment that supports only one wireless access technology on the sidelink interface, there is no doubt that it can only use this wireless access technology on the sidelink interface; but for a user equipment that supports two or more wireless access technologies at the same time, the user equipment can select the wireless access technology based on the logical channel when it has a sidelink communication requirement, that is, the wireless access technologies used by different logical channels on the sidelink interface may be different. In this case, it is necessary to consider how to ensure that the resources allocated by the sidelink communication resource allocation node can match with the wireless access technology selected by each logical channel on the sidelink interface of a user equipment.

SUMMARY

The application provides a method for allocating sidelink resource, which can ensure that the resources allocated by the sidelink resource allocation node can match with the wireless access technology selected by each logical channel on the sidelink interface of a user equipment, and thus ensure that the sidelink data can be transmitted by using the reasonable wireless access technology.

In one embodiment, the application provides a method for allocating sidelink resource, including:

receiving configuration information of logical channel groups of a sidelink interface transmitted by a resource allocation management node, and the configuration information of logical channel groups of the sidelink interface is used to indicate that logical channels using different wireless access technologies correspond respectively to different logical channel groups;

determining a logical channel group corresponding to a logical channel of the sidelink interface according to the configuration information of logical channel groups of the sidelink interface.

In one embodiment, the application provides a method for allocating sidelink resource, including:

transmitting configuration information of logical channel groups of a sidelink interface to a sidelink user equipment to indicate that logical channels using different wireless access technologies correspond respectively to different logical channel groups;

receiving a Buffer Status Report (BSR) reported by the sidelink user equipment based on the configuration information of logical channel groups of the sidelink interface;

allocating transmission resources of the sidelink interface to the sidelink user equipment on physical resources corresponding to a determined wireless access technology according to a correspondence between logical channel groups and wireless access technologies.

In one embodiment, the application provides a sidelink user equipment including a processor and a memory, and the processor is configured to read a program in the memory and perform the process of:

receiving configuration information of logical channel groups of a sidelink interface transmitted by a resource allocation management node, and the configuration information of logical channel groups of the sidelink interface is used to indicate that logical channels using different wireless access technologies correspond respectively to different logical channel groups;

determining a logical channel group corresponding to a logical channel of the sidelink interface according to the configuration information of logical channel groups of the sidelink interface.

In one embodiment, the application provides a resource allocation management node including a processor and a memory, and the processor is configured to read a program in the memory and perform the process of:

transmitting configuration information of logical channel groups of a sidelink interface to a sidelink user equipment to indicate that logical channels using different wireless access technologies correspond respectively to different logical channel groups;

receiving a BSR reported by the sidelink user equipment based on the configuration information of logical channel groups of the sidelink interface;

allocating transmission resources of the sidelink interface to the sidelink user equipment on physical resources corresponding to a determined wireless access technology according to a correspondence between logical channel groups and wireless access technologies.

In one embodiment of the application provides a computer storage medium storing a computer program thereon, where the program, when executed by a processor, causes the processor to perform any solution in other embodiments described above.

In one embodiment of the application provides a computer storage medium storing a computer program thereon, where the program, when executed by a processor, causes the processor to perform any solution in other embodiments described above.

The methods for allocating sidelink resource and apparatuses of the embodiments of the application have the following beneficial effects.

It can be ensured that the resources allocated by the sidelink resource allocation node can match with the wireless access technology selected by each logical channel on the sidelink interface of a user equipment, ensuring that the sidelink data can be transmitted by using the reasonable wireless access technology.

Figure 1:
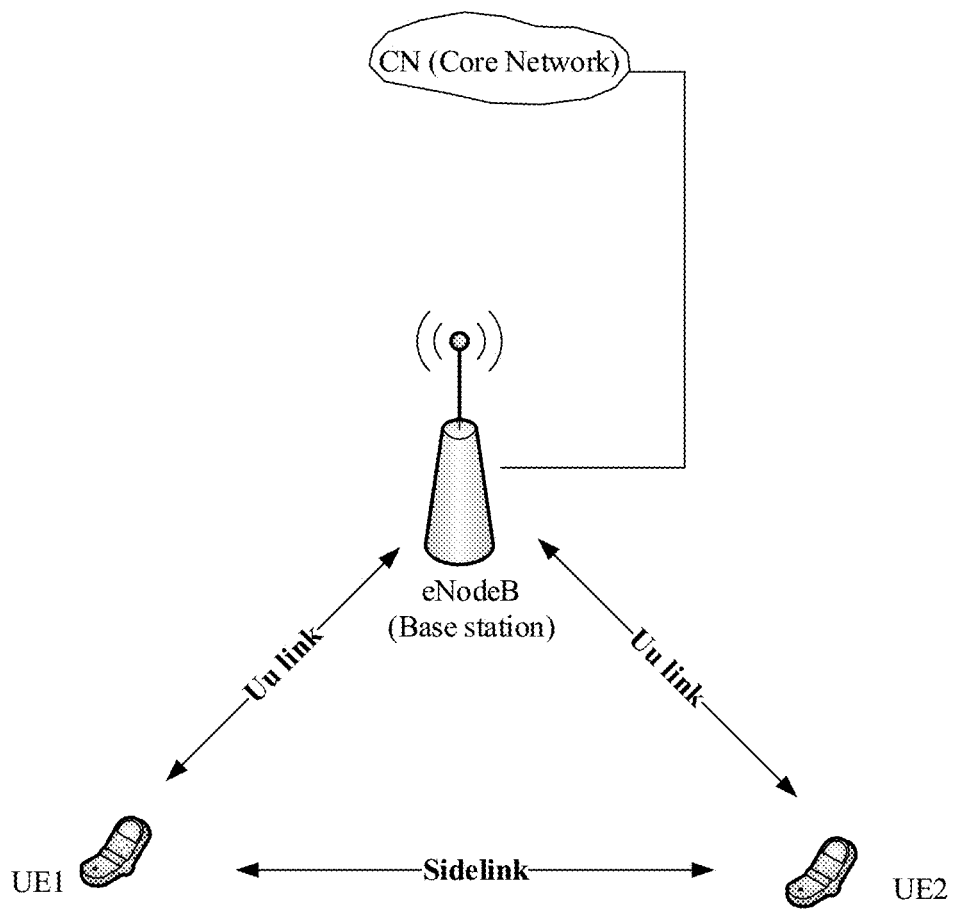
FIG. 1 is a communication schematic diagram of a sidelink user equipment in the prior art.

DETAILED DESCRIPTION (1) In the embodiments of the application, the nouns "network" and "system" are often used alternately.

(2) The term "a plurality of" in the embodiments of the application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

In the embodiments of the application, a sidelink resource allocation management node transmits the configuration information of logical channel groups of a sidelink interface to a sidelink user equipment, and thus can ensure that the resources allocated by the sidelink resource allocation node can match with the wireless access technology selected by each logical channel on the sidelink interface of the user equipment, and thus ensure that the sidelink data can be transmitted by using the reasonable wireless access technology.

The sidelink user equipment in the embodiments of the application is a device with the wireless communication function in the LTE V2X system, and can be deployed on land, including indoor or outdoor, handheld or vehicle-mounted; or can also be deployed on the water (such as ship, etc.); or can also be deployed in the air (e.g., on the airplane, balloon and satellite, etc.). The user equipment may be: a mobile phone, a pad, a computer with wireless transceiver function, a Virtual Reality (VR) user equipment, an Augmented Reality (AR) user equipment, a wireless user equipment in the industrial control, a wireless user equipment in the self driving, a wireless user equipment in the remote medical, a wireless user equipment in the smart grid, a wireless user equipment in the transportation safety, a wireless user equipment in the smart city, a wireless user equipment in the smart home, etc.; or may be various forms of UE, Mobile Station (MS), user equipment device.

The resource allocation management node may be a base station, which is a device that provides the wireless communication function for the user equipment, including but not limited to: gNB in 5G Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the application may also be a device that provides the wireless communication function for the user equipment in other communication systems that may appear in the future.

The resource allocation management node may also be a user equipment as the cluster head in a communication group.

In order to make embodiments of the application clearer, the application will be further illustrated below in details with reference to the accompanying figures. Obviously the described embodiments are merely a part of the embodiments of the application but not all the embodiments.

When the case that the Uu interface assists in the resource allocation of the sidelink interface is discussed in the 3GPP NR V2X project document, as shown in Table 1, three scenarios are proposed:

TABLE 1

| Scenario | Uu link | Sidelink |
|---|---|---|
| 1 | LTE | NR |
| 2 | NR | NR |
| 3 | NR | LTE |

As can be seen from the above table, the user equipments with high capability can support multiple wireless access technologies (such as LTE Rel-14 wireless access technology, LTE Rel-15 wireless access technology and NR wireless access technology) on the sidelink interface. For a user equipment that supports two or more wireless access technologies at the same time, the user equipment can select the wireless access technology based on the logical channel when it has a sidelink communication requirement, that is, the wireless access technologies used by different logical channels on the sidelink interface may be different. In this case, it is necessary to consider how to ensure that the resources allocated by the sidelink resource allocation node can match with the wireless access technology selected by each logical channel on the sidelink interface of a user equipment.

Figure 2:
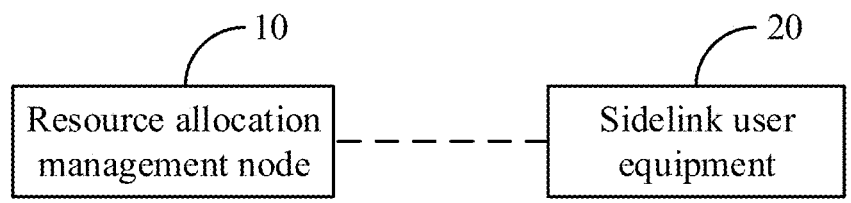
FIG. 2 is a schematic diagram of a resource allocation system for a sidelink interface according to an embodiment of the application.

As shown in FIG. 2, a resource allocation system for a sidelink interface in an embodiment of the application includes:

a resource allocation management node 10 configured to: transmit the configuration information of logical channel groups of a sidelink interface to a sidelink user equipment to indicate that logical channels using different wireless access technologies correspond respectively to different logical channel groups; receive a Buffer Status Report (BSR) reported by the sidelink user equipment based on the configuration information of logical channel groups of the sidelink interface; and allocate transmission resources of the sidelink interface to the sidelink user equipment on physical resources corresponding to a determined wireless access technology according to a correspondence between logical channel groups and wireless access technologies;

a sidelink user equipment 20 configured to receive the configuration information of logical channel groups of the sidelink interface transmitted by the resource allocation management node, and the configuration information of logical channel groups of the sidelink interface is used to indicate that logical channels using different wireless access technologies correspond respectively to different logical channel groups; and determine a logical channel group corresponding to a logical channel of the sidelink interface according to the configuration information of logical channel groups of the sidelink interface.

The sidelink user equipment in the embodiment of the application receives the configuration information of logical channel groups of the sidelink interface transmitted by the sidelink resource allocation management node, which can ensure that all logical channels in the same logical channel group use the same wireless access technology.

In one embodiment, the sidelink user equipment is further configured to: report a Buffer Status Report (BSR) according to the determined logical channel group corresponding to the logical channel of the sidelink interface; and receive transmission resources of the sidelink interface allocated by a radio resource allocation management node according to the BSR.

When reporting the BSR, the sidelink user equipment can report BSRs corresponding to different wireless access technologies by using a same BSR Media Access Control Control Element (MAC CE), or report BSRs corresponding to different wireless access technologies respectively by using independent BSR MAC CEs. In one embodiment, the corresponding reporting mode can be selected according to the occupancy of the BSR MAC CEs.

The resource allocation management node receives BSRs corresponding to different wireless access technologies reported by the sidelink user equipment using a same BSR MAC CE, or receives BSRs corresponding to different wireless access technologies reported respectively by the sidelink user equipment using independent BSR MAC CEs.

In an implementation, the above configuration information of logical channel groups includes two types of information, and one is logical channel group identifiers corresponding to different wireless access technologies, and the other is the logical channel group parameter information corresponding to logical channel group identifiers. The logical channel group parameter information may be the related parameter information of the logical channel in the radio access technology corresponding to the logical channel identifier.

The sidelink user equipment can determine the logical channel group identifier corresponding to the related parameter information of the logical channel of the local sidelink interface according to each logical channel group identifier and the corresponding logical channel parameter information combined with the related parameter information of the logical channel of the local sidelink interface, and report the determined logical channel group identifier to the resource allocation management node, so that the resource allocation management node knows the wireless access technology supported by the logical channel of the sidelink interface of the sidelink user equipment, and selects sidelink interface resources for allocation from the physical resources corresponding to the wireless access technology.

The resource allocation system for the sidelink interface according to the application can ensure that the resources allocated by the sidelink resource allocation node can match with the wireless access technology selected by each logical channel on the sidelink interface of a user equipment, and thus ensure that the sidelink data can be transmitted by using the reasonable wireless access technology.

In one embodiment, the above configuration information of logical channel groups of the sidelink interface is a mapping relationship between QoS (Quality of Service) parameters of the sidelink interface and logical channel group identifiers, and logical channels in a same logical channel group only correspond to a kind of wireless access technology.

Since different wireless access technologies correspond to different logical channels and each logical channel has corresponding QoS parameter, in order to ensure that all logical channels in the same logical channel group use the same wireless access technology, the resource allocation management node can configure a mapping relationship between QoS parameters and logical channel group identifiers respectively based on the QoS parameters of all logical channels corresponding to each wireless access technology, and the logical channel group identifiers corresponding to different wireless access technologies are different. The configured logical channel group identifiers and corresponding QoS parameters are carried in the configuration information of logical channel groups of the sidelink interface and indicated to the sidelink user equipment.

In one embodiment, the sidelink user equipment reports the auxiliary information to the resource allocation management node, and the auxiliary information includes all or a part of QoS parameters corresponding to each logical channel of the sidelink interface of the sidelink user equipment.

The resource allocation management node receives the auxiliary information reported by the sidelink user equipment, and can determine, according to all or a part of QoS parameters corresponding to each logical channel of the sidelink interface of the sidelink user equipment in the auxiliary information, a mapping relationship between all or a part of QoS parameters and logical channel group identifiers, and indicate it the sidelink user equipment.

In an implementation, the above mapping relationship between QoS parameters of the sidelink interface and logical channel group identifiers may be, but not limited to, any one of the followings.

1) A mapping relationship between ProSe Per-Packet Priority (PPPP) and logical channel group identifier.

In the LTE Rel-14 wireless access technology, the QoS parameters of logical channels of different wireless access technologies include PPPP parameter, so the mapping relationship between QoS parameter of the LTE Rel-14 sidelink interface and logical channel group identifier can be the mapping relationship between PPPP and Logical Channel Group IDentifier (LCG ID).

2) A mapping relationship between ProSe Per-Packet Reliability (PPPR) and logical channel group identifier.

In the LTE Rel-15 wireless access technology, the QoS parameters of logical channels of different wireless access technologies include PPPP and/or PPPR parameters. Therefore, the mapping relationship between QoS parameter of the LTE Rel-15 sidelink interface and logical channel group identifier can be the mapping relationship between PPPP and/or PPPR and LCG ID.

3) A mapping relationship between New Radio (NR) QoS parameters and logical channel group identifiers.

In the NR wireless access technology, the QoS parameters of logical channels of different wireless access technologies include 5QI parameter. Therefore, the mapping relationship between QoS parameters of the NR sidelink interface and logical channel group identifiers can be the mapping relationship between 5QI and LCG ID.

When the above configuration information of logical channel groups of the sidelink interface sent by the resource allocation management node is the mapping relationship between QoS parameters of the sidelink interface and logical channel group identifiers, the sidelink user equipment 20 determines a mapping relationship between logical channels of the sidelink interface and logical channel group identifiers corresponding to wireless access technologies according to QoS parameters of each logical channel of the sidelink interface of the sidelink user equipment and the mapping relationship between logical channel group identifiers and QoS parameters after receiving the above configuration information of logical channel groups of the sidelink interface.

In an implementation, the logical channels of the sidelink user equipment 20 on the sidelink interface are known, and a mapping relationship table between logical channels and QoS parameters is stored locally. The sidelink user equipment 20 can determine the QoS parameter of each logical channel, and compare the QoS parameter of each logical channel with the QoS parameter corresponding to each logical channel group identifier. If it is determined that the QoS parameter of a logical channel meets all the requirements of the QoS parameter corresponding to a logical channel group identifier, it is determined that the logical channel uses the wireless access technology corresponding to the logical channel group identifier.

As another optional implementation, the above configuration information of logical channel groups of the sidelink interface is a mapping relationship between logical channels of the sidelink interface and logical channel group identifiers, and logical channels in a same logical channel group only correspond to a kind of wireless access technology.

During this implementation, since the resource allocation management node does not know the logical channels of the sidelink interface local to the sidelink user equipment, there is a need for the sidelink user equipment to report the auxiliary information. In one embodiment, the sidelink user equipment is further configured to report the auxiliary information to the resource allocation management node, and the auxiliary information includes each logical channel identifier of the sidelink interface of the sidelink user equipment and its corresponding QoS parameters.

The resource allocation management node is configured to receive the auxiliary information reported by the sidelink user equipment, and the auxiliary information includes each logical channel identifier of the sidelink interface of the sidelink user equipment and its corresponding QoS parameters; and determine the configuration information of logical channel groups of the sidelink interface according to the auxiliary information reported by the sidelink user equipment.

In an implementation, since the resource allocation management node stores a mapping table between different logical channels and corresponding QoS parameters locally, the corresponding logical channel can be determined according to the logical channel identifier reported by the sidelink user equipment through the mapping table, and the logical channel group corresponding to logical channels of the sidelink interface of the sidelink user equipment is determined according to logical channels corresponding to different wireless access technologies, so that the logical channels of the sidelink interface of the sidelink user equipment and the corresponding logical channel group identifiers are used as the configuration information of logical channel groups of the sidelink interface and indicated to the sidelink user equipment.

As another optional implementation, the auxiliary information reported by the sidelink user equipment to the resource allocation management node includes each logical channel identifier of the sidelink interface of the sidelink user equipment and its corresponding QoS parameters, and the wireless access technology that each logical channel expects to use.

In an implementation, since the resource allocation management node stores a mapping table between different logical channels and corresponding QoS parameters locally, the logical channels to which the QoS reported by the sidelink user equipment is mapped can be determined according to the mapping table, the logical channel group corresponding to logical channels of the sidelink interface of the sidelink user equipment is determined according to logical channels corresponding to different wireless access technologies, and a mapping relationship between logical channels of the sidelink interface and logical channel group identifiers corresponding to the expected wireless access technology is determined, so that the mapping relationship between logical channels of the sidelink interface and logical channel group identifiers corresponding to the expected wireless access technology is used as the configuration information of logical channel groups of the sidelink interface and indicated to the sidelink user equipment.

In one embodiment, the sidelink user equipment determines the logical channel group identifier corresponding to a local logical channel based on the configuration information of logical channel groups of the sidelink interface, organizes the Sidelink BSR according to the local logical channel and the corresponding logical channel group identifier, and reports the Sidelink BSR when the trigger condition of Sidelink BSR reporting is satisfied, so that the resource allocation management node knows the local logical channel of the sidelink user equipment and the corresponding logical channel group identifier.

In one embodiment, after the sidelink resource allocation management node receives the Sidelink BSR reported by the user equipment, the process further includes: determining the wireless access technology corresponding to the logical channel of the sidelink interface of the sidelink user equipment based on a correspondence between logical channel groups and wireless access technologies according to the Sidelink BSR, and allocating transmission resources of the sidelink interface to the sidelink user equipment on physical resources corresponding to the determined wireless access technology.

There are two ways for the sidelink resource allocation management node to determine the correspondence between wireless access technologies and physical resources.

In one way, the correspondence between wireless access technologies and physical resources is pre-configured to the sidelink resource allocation management node and the user equipment, and the sidelink resource allocation management node determines the physical resources corresponding to the wireless access technology according to the pre-configured information, where the scheduling signaling transmitted by the resource allocation management node to the sidelink user equipment or the PDSCH (Physical Downlink Shared Chanel) scheduled by the scheduling signaling does not need to carry the indication information of wireless access technology.

In another way, the resource allocation management node determines the correspondence between wireless access technologies and physical resources dynamically. In this case, the resource allocation management node indicates a mapping relationship between physical resources and wireless access technologies or QoS parameters or logical channels allocated for the sidelink interface to the sidelink user equipment through the sidelink interface scheduling signaling transmitted on the Uu interface or the PDSCH scheduled by the sidelink interface scheduling signaling transmitted on the Uu interface.

In one embodiment, the sidelink user equipment receives the mapping relationship between physical resources allocated for the sidelink interface and wireless access technologies, or physical resources allocated for the sidelink interface and QoS parameters, or physical resources allocated for the sidelink interface and logical channels indicated by the resource allocation management node through the sidelink interface scheduling signaling transmitted on the Uu interface or the PDSCH scheduled by the sidelink interface scheduling signaling transmitted on the Uu interface.

Figure 3:
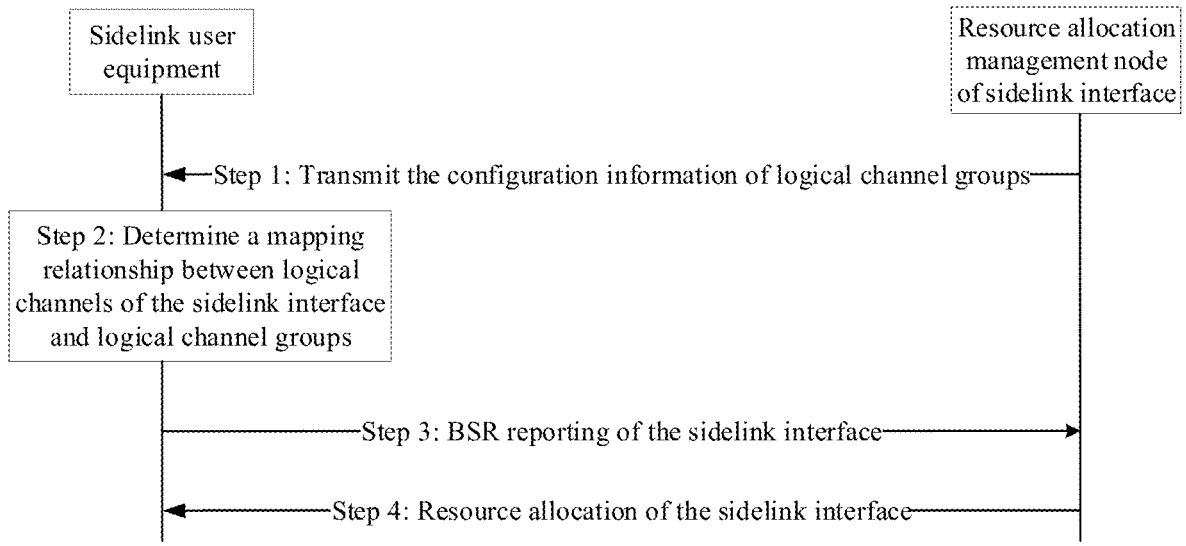
FIG. 3 is a flow chart of interaction between a sidelink user equipment and a resource allocation management node according to an embodiment of the application.

As shown in FIG. 3, a flowchart of the interaction between the resource allocation management node and the sidelink user equipment in this embodiment mainly includes the following steps.

Step 1: the sidelink resource allocation management node transmits the configuration information of logical channel groups of a sidelink interface to the sidelink user equipment, where the configuration information of logical channel groups of the sidelink interface includes the QoS parameters of logical channels and the corresponding logical channel group identifiers.

Step 2: the sidelink user equipment determines a mapping relationship between logical channels of the sidelink interface and logical channel groups.

After the sidelink user equipment receives the configuration information of logical channel groups of the sidelink interface transmitted by the sidelink resource allocation management node, when the configuration information includes the QoS parameters of logical channels and the corresponding logical channel group identifiers, then a mapping relationship between logical channels and logical channel group identifiers is determined according to the local mapping relationship between logical channels of the sidelink interface and QoS parameters. For example, the QoS parameter of the logical channel is PPPP, so the logical channel group identifier corresponding to the logical channel is determined according to the mapping relationship between PPPP and logical channel group identifier indicated in the indication information; when the QoS parameter of the logical channel is 5Q1, then the logical channel group identifier corresponding to the logical channel is determined according to the mapping relationship between 5Q1 and logical channel group identifier indicated in the indication information.

Step 3: the sidelink user equipment reports the BSR through the sidelink interface.

The sidelink user equipment organizes the Sidelink BSR based on the configuration information of logical channel groups of the sidelink interface, and reports the Sidelink BSR when the trigger condition of Sidelink BSR reporting is satisfied.

Step 4: the resource allocation management node allocates sidelink interface resource for the sidelink user equipment.

After the sidelink resource allocation management node receives the Sidelink BSR reported by the user equipment, the process further includes: allocating transmission resources of the sidelink interface to the user equipment on physical resources corresponding to each wireless access technology based on a correspondence between logical channel groups and wireless access technologies.

There may be two ways to determine the correspondence between logical channel groups and wireless access technologies, which can refer to the description of the foregoing embodiments and will not be repeated here.

Figure 4:
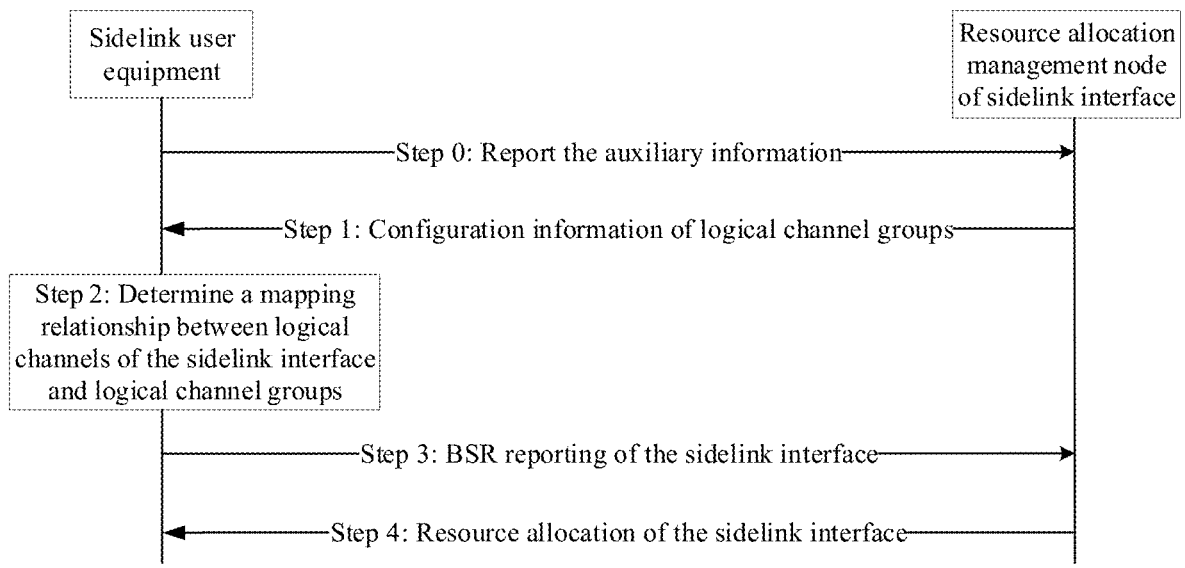
FIG. 4 is a flow chart of interaction between a sidelink user equipment and a resource allocation management node according to another embodiment of the application.

As shown in FIG. 4, a flowchart of the interaction between the resource allocation management node and the sidelink user equipment in another embodiment mainly includes the following steps.

Step 0: the sidelink user equipment reports the auxiliary information.

The auxiliary information includes at least each logical channel identifier of the sidelink interface of the user equipment and its corresponding QoS parameters, or includes at least each logical channel identifier of the sidelink interface of the sidelink user equipment and its corresponding QoS parameters, and the wireless access technology that each logical channel expects to use.

For the former, the QoS parameters used by different wireless access technologies may be different, and the sidelink resource allocation management node can determine the wireless access technology corresponding to the logical channel of the sidelink user equipment according to the difference of QoS parameters or the mapping relationship between QoS parameters and wireless access technologies stored by the sidelink resource allocation management node; and for the latter, the sidelink resource allocation management node can determine the wireless access technology corresponding to the logical channel directly according to the wireless access technology reported by the user equipment.

Step 1: the sidelink resource allocation management node transmits the configuration information of logical channel groups of a sidelink interface to the sidelink user equipment.

The configuration information of logical channel groups of the sidelink interface transmitted by the sidelink resource allocation management node is a mapping relationship between logical channels of the sidelink interface and logical channel group identifiers, and it is necessary to ensure that the logical channels using different wireless access technologies correspond to different logical channel group identifiers.

Step 2: the sidelink user equipment determines a mapping relationship between sidelink logical channels and logical channel groups.

After receiving the configuration information of logical channel groups of the sidelink interface transmitted by the sidelink resource allocation management node, the sidelink user equipment determines a mapping relationship between logical channels and logical channel group identifiers.

Step 3: the sidelink user equipment reports the BSR through the sidelink interface.

The sidelink user equipment organizes the Sidelink BSR based on the indication information, and reports the Sidelink BSR when the trigger condition of Sidelink BSR reporting is satisfied.

Step 4: the resource allocation management node allocates sidelink interface resource for the sidelink user equipment.

After the sidelink resource allocation management node receives the Sidelink BSR reported by the user equipment, the process further includes: allocating transmission resources of the sidelink interface to the user equipment on physical resources corresponding to each wireless access technology based on a correspondence between logical channel groups and wireless access technologies.

There may be two ways to determine the correspondence between logical channel groups and wireless access technologies, which can refer to the description of the foregoing embodiments and will not be repeated here.

Figure 5:
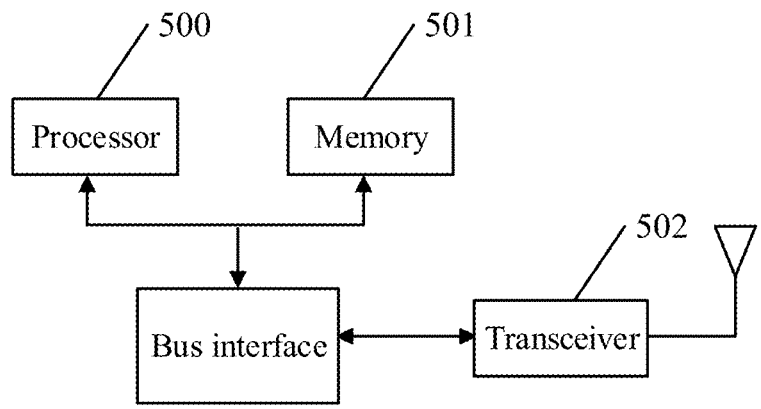
FIG. 5 is a schematic structural diagram of a first resource allocation management node according to an embodiment of the application.

As shown in FIG. 5, a first resource allocation management node of an embodiment of the application includes: a processor 500, a memory 501 and a transceiver 502.

The processor 500 is responsible for managing the bus architecture and general processing, and the memory 501 may store the data used by the processor 500 when performing the operations. The transceiver 502 is configured to receive and transmit the data under the control of the processor 500.

The bus architecture may include any numbers of interconnected buses and bridges, and specifically link various circuits of one or more processors represented by the processor 500 and the memory represented by the memory 501. The bus architecture may further link various other circuits such as peripheral device, voltage regulator and power management circuit, which are all well known in the art and thus will not be further described again herein. The bus interface provides an interface. The processor 500 is responsible for managing the bus architecture and general processing, and the memory 501 may store the data used by the processor 500 when performing the operations.

The procedure disclosed by the embodiment of the application may be applied in the processor 500 or implemented by the processor 500. In the implementation process, each step of the signal processing flow may be completed by the integrated logic circuit of hardware in the processor 500 or the instruction in the form of software. The processor 500 may be a general-purpose processor, a digital signal processor, an application specific integrated circuit, a field programmable gate array or other programmable logic device, a discrete gate or transistor logic device, or a discrete hardware device, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 501, and the processor 500 reads the information in the memory 501 and completes the steps of the signal processing flow in combination with its hardware.

The processor 500 is configured to read a program in the memory 501 and perform the process of:

transmitting the configuration information of logical channel groups of a sidelink interface to a sidelink user equipment to indicate that logical channels using different wireless access technologies correspond respectively to different logical channel groups;

receiving a Buffer Status Report (BSR) reported by the sidelink user equipment based on the configuration information of logical channel groups of the sidelink interface;

allocating transmission resources of the sidelink interface to the sidelink user equipment on physical resources corresponding to a determined wireless access technology according to a correspondence between logical channel groups and wireless access technologies.

In one embodiment, the processor is configured to: report BSRs corresponding to different wireless access technologies by using a same BSR MAC CE, or report BSRs corresponding to different wireless access technologies respectively by using independent BSR MAC CEs.

In one embodiment, the configuration information of logical channel groups of the sidelink interface is a mapping relationship between QoS parameters of the sidelink interface and logical channel group identifiers, and logical channels in a same logical channel group only correspond to a kind of wireless access technology.

In one embodiment, the processor is further configured to: report the auxiliary information to the resource allocation management node, and the auxiliary information includes all or a part of QoS parameters corresponding to each logical channel of a sidelink interface of a sidelink user equipment.

In one embodiment, the mapping relationship between QoS parameters of the sidelink interface and logical channel group identifiers is any one or a combination of:

a mapping relationship between PPPP and logical channel group identifiers;

a mapping relationship between PPPR and logical channel group identifiers;

a mapping relationship between NR QoS parameters and logical channel group identifiers.

In one embodiment, the configuration information of logical channel groups of the sidelink interface is a mapping relationship between logical channels of the sidelink interface and logical channel group identifiers, and it is necessary to ensure that logical channels in a same logical channel group can only correspond to a kind of wireless access technology.

In one embodiment, the processor is further configured to: receive the auxiliary information reported by the sidelink user equipment, and the auxiliary information includes at least each logical channel identifier of a sidelink interface of the sidelink user equipment and its corresponding QoS parameters; and determine the configuration information of logical channel groups of the sidelink interface according to the auxiliary information reported by the sidelink user equipment.

In one embodiment, the auxiliary information further includes a wireless access technology that each logical channel of the sidelink interface of the sidelink user equipment expects to use.

In one embodiment, the processor is further configured to: determine a mapping relationship between logical channels of the sidelink interface and logical channel group identifiers according to QoS parameters of each logical channel of the sidelink interface of the sidelink user equipment and a mapping relationship between wireless access technologies and QoS parameters.

In one embodiment, the processor is further configured to: pre-configure a mapping relationship between wireless access technologies and physical resources; or determine a mapping relationship between wireless access technologies and physical resources dynamically.

In one embodiment, the processor is further configured to: indicate a mapping relationship between physical resources allocated for the sidelink interface and wireless access technologies or QoS parameters or logical channels to the sidelink user equipment through the sidelink interface scheduling signaling transmitted on a Uu interface or a PDSCH scheduled by the sidelink interface scheduling signaling transmitted on the Uu interface.

In one embodiment, the resource allocation management node is a network-side device or a user equipment as a cluster head in a communication group.

Figure 6:
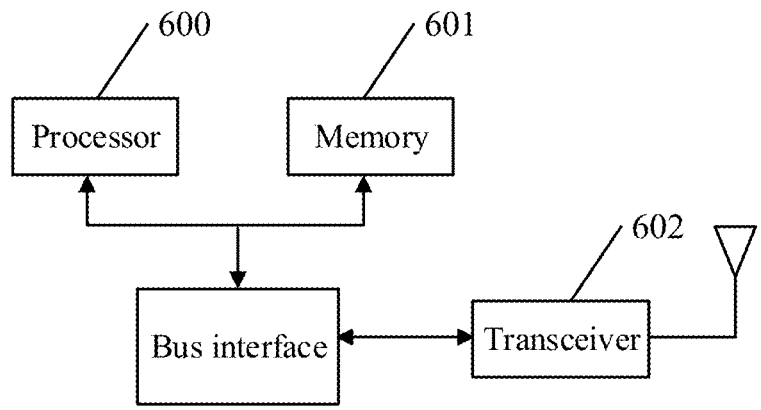
FIG. 6 is a schematic structural diagram of a first sidelink user equipment according to an embodiment of the application.

As shown in FIG. 6, a first sidelink user equipment of an embodiment of the application includes: a processor 600, a memory 601 and a transceiver 602.

The processor 600 is responsible for managing the bus architecture and general processing, and the memory 601 may store the data used by the processor 600 when performing the operations. The transceiver 602 is configured to receive and transmit the data under the control of the processor 600.

The bus architecture may include any numbers of interconnected buses and bridges, and specifically link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by the embodiment of the application may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware device, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

The processor 600 is configured to read a program in the memory 601 and perform the process of:

receiving the configuration information of logical channel groups of a sidelink interface transmitted by a resource allocation management node, and the configuration information of logical channel groups of the sidelink interface is used to indicate that logical channels using different wireless access technologies correspond respectively to different logical channel groups;

determining a logical channel group corresponding to a logical channel of the sidelink interface according to the configuration information of logical channel groups of the sidelink interface.

In one embodiment, the above processor is further configured to: report a BSR according to the determined logical channel group corresponding to the logical channel of the sidelink interface; and receive transmission resources of the sidelink interface allocated by a radio resource allocation management node according to the BSR.

In one embodiment, the configuration information of logical channel groups of the sidelink interface is a mapping relationship between QoS parameters of the sidelink interface and logical channel group identifiers, and logical channels in a same logical channel group only correspond to a kind of wireless access technology.

In one embodiment, the processor is further configured to: receive the auxiliary information reported by the sidelink user equipment, and the auxiliary information includes all or a part of QoS parameters corresponding to each logical channel of the sidelink interface of the sidelink user equipment.

In one embodiment, the mapping relationship between QoS parameters of the sidelink interface and logical channel group identifiers is any one or a combination of:

a mapping relationship between PPPP and logical channel group identifiers;

a mapping relationship between PPPR and logical channel group identifiers;

a mapping relationship between NR QoS parameters and logical channel group identifiers.

In one embodiment, the configuration information of logical channel groups of the sidelink interface is a mapping relationship between logical channels of the sidelink interface and logical channel group identifiers, and logical channels in a same logical channel group only correspond to a kind of wireless access technology.

In one embodiment, the processor is further configured to: report the auxiliary information to the resource allocation management node, and the auxiliary information includes each logical channel identifier of the sidelink interface of the sidelink user equipment and corresponding QoS parameters.

In one embodiment, the auxiliary information further includes a wireless access technology that each logical channel of the sidelink interface of the sidelink user equipment expects to use.

In one embodiment, the processor is further configured to: receive a mapping relationship between physical resources allocated for the sidelink interface and wireless access technologies, or physical resources allocated for the sidelink interface and QoS parameters, or physical resources allocated for the sidelink interface and logical channels indicated by the resource allocation management node through the sidelink interface scheduling signaling transmitted on a Uu interface or a PDSCH scheduled by the sidelink interface scheduling signaling transmitted on the Uu interface.

Figure 7:
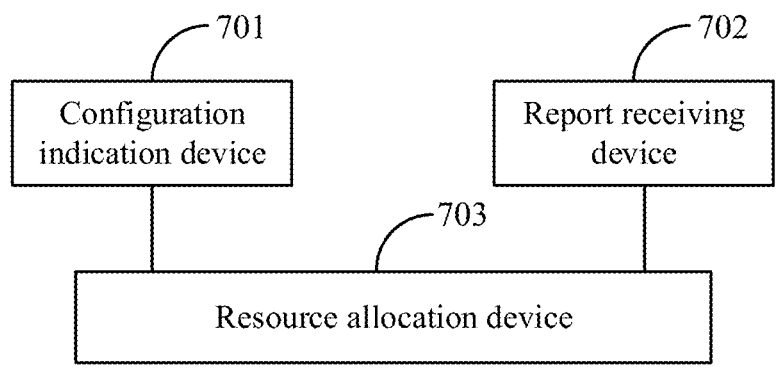
FIG. 7 is a schematic structural diagram of a second resource allocation management node according to an embodiment of the application.

As shown in FIG. 7, a second resource allocation management node of an embodiment of the application includes:

a configuration indication device 701 configured to transmit the configuration information of logical channel groups of a sidelink interface to a sidelink user equipment to indicate that logical channels using different wireless access technologies correspond respectively to different logical channel groups;

a report receiving device 702 configured to receive a BSR reported by the sidelink user equipment based on the configuration information of logical channel groups of the sidelink interface;

a resource allocation device 703 configured to allocate transmission resources of the sidelink interface to the sidelink user equipment on physical resources corresponding to a determined wireless access technology according to a correspondence between logical channel groups and wireless access technologies.

In one embodiment, the report receiving device 702 receives BSRs corresponding to different wireless access technologies reported by the sidelink user equipment using a same BSR MAC CE, or receives BSRs corresponding to different wireless access technologies reported respectively by the sidelink user equipment using independent BSR MAC CEs.

In one embodiment, the configuration information of logical channel groups of the sidelink interface is a mapping relationship between QoS parameters of the sidelink interface and logical channel group identifiers, and logical channels in a same logical channel group only correspond to a kind of wireless access technology.

In one embodiment, the resource allocation management node further includes: a parameter receiving device configured to receive the auxiliary information reported by the sidelink user equipment, and the auxiliary information includes all or a part of QoS parameters corresponding to each logical channel of the sidelink interface of the sidelink user equipment.

In one embodiment, the mapping relationship between QoS parameters of the sidelink interface and logical channel group identifiers is any one or a combination of:

a mapping relationship between PPPP and logical channel group identifiers;

a mapping relationship between PPPR and logical channel group identifiers;

a mapping relationship between NR QoS parameters and logical channel group identifiers.

In one embodiment, the configuration information of logical channel groups of the sidelink interface is a mapping relationship between logical channels of the sidelink interface and logical channel group identifiers, and it is necessary to ensure that logical channels in a same logical channel group can only correspond to a kind of wireless access technology.

In one embodiment, the configuration indication device is further configured to: receive the auxiliary information reported by the sidelink user equipment, and the auxiliary information includes at least each logical channel identifier of the sidelink interface of the sidelink user equipment and its corresponding QoS parameters; and determine the configuration information of logical channel groups of the sidelink interface according to the auxiliary information reported by the sidelink user equipment.

In one embodiment, the auxiliary information further includes a wireless access technology that each logical channel of the sidelink interface of the sidelink user equipment expects to use.

In one embodiment, the resource allocation device 703 is further configured to: determine a mapping relationship between logical channels of the sidelink interface and logical channel group identifiers according to each logical channel identifier of the sidelink interface of the sidelink user equipment, its corresponding QoS parameters, and a mapping relationship between wireless access technologies and QoS parameters.

In one embodiment, the resource allocation device 703 is further configured to: pre-configure a mapping relationship between wireless access technologies and physical resources; or determine a mapping relationship between wireless access technologies and physical resources dynamically.

In one embodiment, the resource allocation device 703 is further configured to: indicate a mapping relationship between physical resources allocated for the sidelink interface and wireless access technologies or QoS parameters or logical channels to the sidelink user equipment through the sidelink interface scheduling signaling transmitted on a Uu interface or a PDSCH scheduled by the sidelink interface scheduling signaling transmitted on the Uu interface.

In one embodiment, the resource allocation management node is a network-side device or a user equipment as a cluster head in a communication group.

Figure 8:
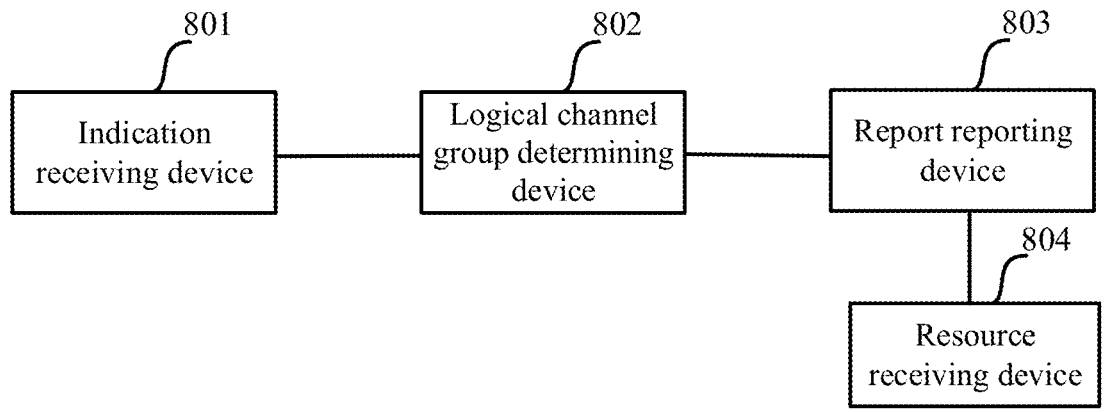
FIG. 8 is a schematic structural diagram of a second sidelink user equipment according to an embodiment of the application.

As shown in FIG. 8, a second sidelink user equipment of an embodiment of the application includes:

an indication receiving device 801 configured to receive the configuration information of logical channel groups of a sidelink interface transmitted by a resource allocation management node, and the configuration information of logical channel groups of the sidelink interface is used to indicate that logical channels using different wireless access technologies correspond respectively to different logical channel groups;

a logical channel group determining device 802 configured to determine a logical channel group corresponding to a logical channel of the sidelink interface according to the configuration information of logical channel groups of the sidelink interface.

In one embodiment, the sidelink user equipment further includes: a report reporting device 803 configured to report a Buffer Status Report (BSR) according to the determined logical channel group corresponding to the logical channel of the sidelink interface; and a resource receiving device 804 configured to receive transmission resources of the sidelink interface allocated by a radio resource allocation management node according to the BSR.

In one embodiment, the report reporting device 803 reports BSRs corresponding to different wireless access technologies by using a same BSR MAC CE, or reports BSRs corresponding to different wireless access technologies respectively by using independent BSR MAC CEs.

In one embodiment, the configuration information of logical channel groups of the sidelink interface is a mapping relationship between QoS parameters of the sidelink interface and logical channel group identifiers, and logical channels in a same logical channel group only correspond to a kind of wireless access technology.

In one embodiment, the sidelink user equipment further includes: a first auxiliary information reporting device configured to report the auxiliary information to the resource allocation management node, and the auxiliary information includes all or a part of QoS parameters corresponding to each logical channel of the sidelink interface of the sidelink user equipment.

In one embodiment, the mapping relationship between QoS parameters of the sidelink interface and logical channel group identifiers is any one or a combination of:

a mapping relationship between PPPP and logical channel group identifiers;

a mapping relationship between PPPR and logical channel group identifiers;

a mapping relationship between NR QoS parameters and logical channel group identifiers.

In one embodiment, the configuration information of logical channel groups of the sidelink interface is a mapping relationship between logical channels of the sidelink interface and logical channel group identifiers, and logical channels in a same logical channel group only correspond to a kind of wireless access technology.

In one embodiment, the sidelink user equipment further includes: a second auxiliary information reporting device configured to report the auxiliary information to the resource allocation management node, and the auxiliary information includes each logical channel identifier of the sidelink interface of the sidelink user equipment and its corresponding QoS parameters.

In one embodiment, the auxiliary information further includes a wireless access technology that each logical channel of the sidelink interface of the sidelink user equipment expects to use.

In one embodiment, the resource receiving device is further configured to: receive a mapping relationship between physical resources allocated for the sidelink interface and wireless access technologies, or physical resources allocated for the sidelink interface and QoS parameters, or physical resources allocated for the sidelink interface and logical channels indicated by the resource allocation management node through the sidelink interface scheduling signaling transmitted on a Uu interface or a PDSCH scheduled by the sidelink interface scheduling signaling transmitted on the Uu interface.

An embodiment of the application provides a readable storage medium that is a non-volatile readable storage medium and includes program codes. When the program codes run on a computing device, the program codes are configured to cause the computing device to perform the actions of the resource allocation management node to perform the resource allocation described above.

An embodiment of the application provides a readable storage medium that is a non-volatile readable storage medium and includes program codes. When the program codes run on a computing device, the program codes are configured to cause the computing device to perform the actions of the sidelink user equipment to determine transmission resources described above.

An embodiment of the application provides a computer program product containing instructions, which cause a computer to perform the actions of the resource allocation management node to perform the resource allocation described above when running on the computer.

An embodiment of the application provides a computer program product containing instructions, which cause a computer to perform the actions of the sidelink user equipment to determine resources described above when running on the computer.

Based upon the same inventive concept, an embodiment of the application further provides a method for allocating sidelink resource. Since the device corresponding to this method is the sidelink user equipment in the resource allocation system of sidelink interface in the embodiments of the application, and the principle solving the problem of this method is similar to that of the device, the implementations of this method may refer to the implementations of the system, and the repeated description thereof will be omitted here.

Figure 9:
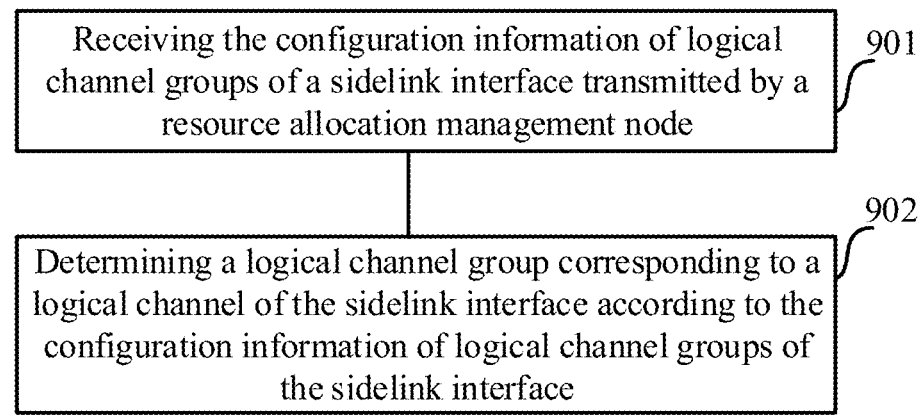
FIG. 9 is a schematic flowchart of a method for allocating sidelink resource according to an embodiment of the application.

As shown in FIG. 9, the method for allocating sidelink resource in the embodiment of the application includes the following steps.

Step 901: receiving the configuration information of logical channel groups of a sidelink interface transmitted by a resource allocation management node, and the configuration information of logical channel groups of the sidelink interface is used to indicate that logical channels using different wireless access technologies correspond respectively to different logical channel groups.

Step 902: determining a logical channel group corresponding to a logical channel of the sidelink interface according to the configuration information of logical channel groups of the sidelink interface.

In one embodiment, the method further includes: reporting a Buffer Status Report (BSR) according to the determined logical channel group corresponding to the logical channel of the sidelink interface; and receiving transmission resources of the sidelink interface allocated by a radio resource allocation management node according to the BSR.

In one embodiment, the step of reporting the BSR includes: reporting BSRs corresponding to different wireless access technologies by using a same BSR MAC CE, or reporting BSRs corresponding to different wireless access technologies respectively by using independent BSR MAC CEs.

In one embodiment, the configuration information of logical channel groups of the sidelink interface is a mapping relationship between QoS parameters of the sidelink interface and logical channel group identifiers, and logical channels in a same logical channel group only correspond to a kind of wireless access technology.

In one embodiment, the method further includes: reporting the auxiliary information to the resource allocation management node, and the auxiliary information includes all or a part of QoS parameters corresponding to each logical channel of the sidelink interface of the sidelink user equipment.

In one embodiment, the mapping relationship between QoS parameters of the sidelink interface and logical channel group identifiers is any one or a combination of:

a mapping relationship between PPPP and logical channel group identifiers;

a mapping relationship between PPPR and logical channel group identifiers;

a mapping relationship between NR QoS parameters and logical channel group identifiers.

In one embodiment, the configuration information of logical channel groups of the sidelink interface is a mapping relationship between logical channels of the sidelink interface and logical channel group identifiers, and logical channels in a same logical channel group only correspond to a kind of wireless access technology.

In one embodiment, the method further includes: reporting the auxiliary information to the resource allocation management node, and the auxiliary information includes each logical channel identifier of the sidelink interface of the sidelink user equipment and its corresponding QoS parameters.

In one embodiment, the auxiliary information further includes a wireless access technology that each logical channel of the sidelink interface of the sidelink user equipment expects to use.

In one embodiment, the method further includes: receiving a mapping relationship between physical resources allocated for the sidelink interface and wireless access technologies, or physical resources allocated for the sidelink interface and QoS parameters, or physical resources allocated for the sidelink interface and logical channels indicated by the resource allocation management node through the sidelink interface scheduling signaling transmitted on a Uu interface or a PDSCH scheduled by the sidelink interface scheduling signaling transmitted on the Uu interface.

Based upon the same inventive concept, an embodiment of the application further provides a method for allocating sidelink resource. Since the device corresponding to this method is the resource allocation management node in the resource allocation system of sidelink interface in the embodiments of the application, and the principle solving the problem of this method is similar to that of the device, the implementations of this method may refer to the implementations of the system, and the repeated description thereof will be omitted here.

Figure 10:
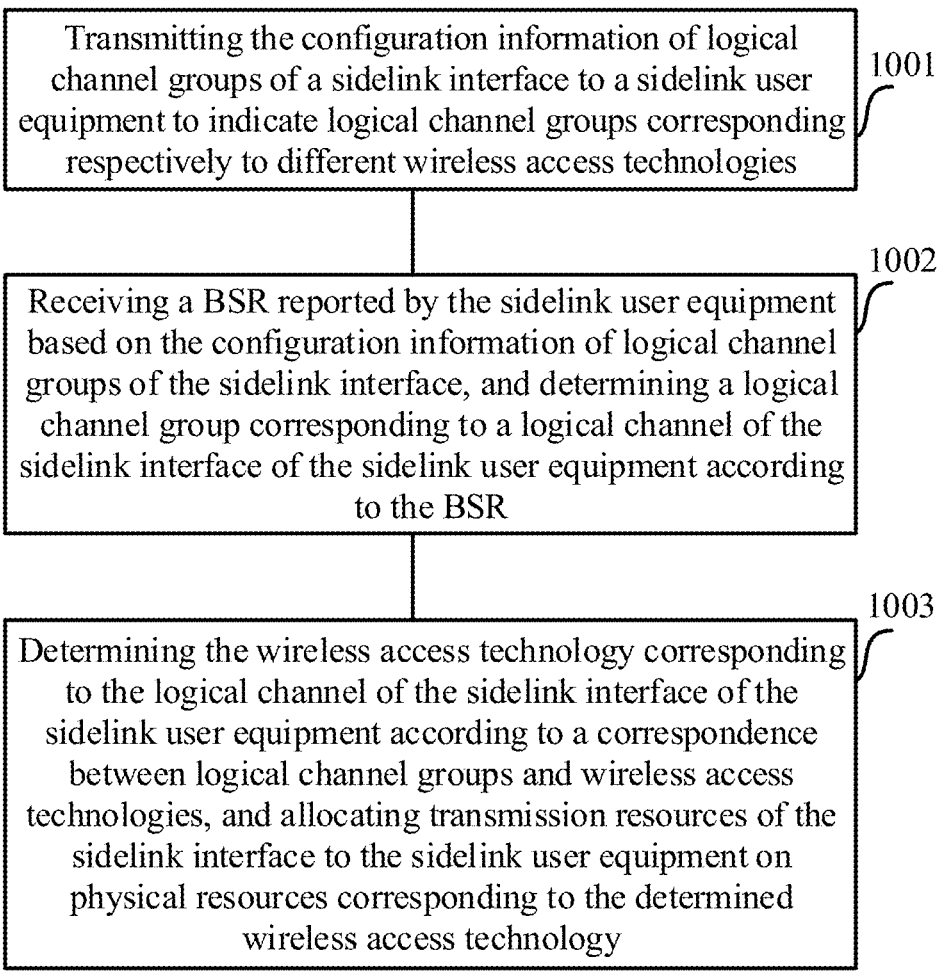
FIG. 10 is a schematic flowchart of a method for allocating sidelink resource according to an embodiment of the application.

As shown in FIG. 10, the method for allocating sidelink resource in the embodiment of the application includes the following steps.

Step 1001: transmitting the configuration information of logical channel groups of a sidelink interface to a sidelink user equipment to indicate that logical channels using different wireless access technologies correspond respectively to different logical channel groups.

Step 1002: receiving a BSR reported by the sidelink user equipment based on the configuration information of logical channel groups of the sidelink interface.

Step 1003: allocating transmission resources of the sidelink interface to the sidelink user equipment on physical resources corresponding to a determined wireless access technology according to a correspondence between logical channel groups and wireless access technologies.

In one embodiment, the step of receiving the BSR reported by the sidelink user equipment includes: receiving BSRs corresponding to different wireless access technologies reported by the sidelink user equipment using a same BSR MAC CE, or receiving BSRs corresponding to different wireless access technologies reported respectively by the sidelink user equipment using independent BSR MAC CEs.

In one embodiment, the configuration information of logical channel groups of the sidelink interface is a mapping relationship between QoS parameters of the sidelink interface and logical channel group identifiers, and logical channels in a same logical channel group only correspond to a kind of wireless access technology.

In one embodiment, the method further includes: receiving the auxiliary information reported by the sidelink user equipment, and the auxiliary information includes all or a part of QoS parameters corresponding to each logical channel of the sidelink interface of the sidelink user equipment.

In one embodiment, the mapping relationship between QoS parameters of the sidelink interface and logical channel group identifiers is any one or a combination of:

a mapping relationship between PPPP and logical channel group identifiers;

a mapping relationship between PPPR and logical channel group identifiers;

a mapping relationship between NR QoS parameters and logical channel group identifiers.

In one embodiment, the configuration information of logical channel groups of the sidelink interface is a mapping relationship between logical channels of the sidelink interface and logical channel group identifiers, and it is necessary to ensure that logical channels in a same logical channel group can only correspond to a kind of wireless access technology.

In one embodiment, the method further includes: receiving the auxiliary information reported by the sidelink user equipment, and the auxiliary information includes at least each logical channel identifier of a sidelink interface of the sidelink user equipment and its corresponding QoS parameters; and determining the configuration information of logical channel groups of the sidelink interface according to the auxiliary information reported by the sidelink user equipment.

In one embodiment, the auxiliary information further includes a wireless access technology that each logical channel of the sidelink interface of the sidelink user equipment expects to use.

In one embodiment, the method further includes: determining a mapping relationship between logical channels of the sidelink interface and logical channel group identifiers according to each logical channel identifier of the sidelink interface of the sidelink user equipment, its corresponding QoS parameters, and a mapping relationship between wireless access technologies and QoS parameters.

In one embodiment, the method further includes: pre-configuring a mapping relationship between wireless access technologies and physical resources; or determining a mapping relationship between wireless access technologies and physical resources dynamically.

In one embodiment, the method further includes: indicating a mapping relationship between physical resources allocated for the sidelink interface and wireless access technologies or QoS parameters or logical channels to the sidelink user equipment through the sidelink interface scheduling signaling transmitted on a Uu interface or a PDSCH scheduled by the sidelink interface scheduling signaling transmitted on the Uu interface.

In one embodiment, the method is applied to a network-side device or a user equipment as a cluster head in a communication group.

The embodiments of the application can provide methods, systems and computer program products. Thus the application can take the form of hardware embodiments alone, software embodiments alone, or embodiments combining the software and hardware aspects. Also the application can take the form of computer program products implemented on one or more computer usable storage mediums (including but not limited to magnetic disk memories, optical memories and the like) containing computer usable program codes therein.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for allocating sidelink resource, comprising:
reporting auxiliary information to a resource allocation management node;
receiving configuration information of logical channel groups of a sidelink interface transmitted by the resource allocation management node, wherein the configuration information of logical channel groups of the sidelink interface is used to indicate that logical channels using different wireless access technologies correspond respectively to different logical channel groups; and
determining a logical channel group corresponding to a logical channel of the sidelink interface according to the configuration information of logical channel groups of the sidelink interface;
wherein the configuration information of logical channel groups of the sidelink interface is a mapping relationship between Quality of Service, QoS, parameters of the sidelink interface and logical channel group identifiers or a mapping relationship between logical channels of the sidelink interface and logical channel group identifiers, and logical channels in a same logical channel group only correspond to a kind of wireless access technology;
when the configuration information of logical channel groups of the sidelink interface is the mapping relationship between logical channels of the sidelink interface and logical channel group identifiers, the auxiliary information comprises QoS parameters corresponding to each logical channel of a sidelink interface of a sidelink user equipment and a wireless access technology that each logical channel of the sidelink interface of the sidelink user equipment expects to use.

2. The method according to claim 1, further comprising:
reporting a Buffer Status Report, BSR, according to the determined logical channel group corresponding to a logical channel of the sidelink interface;
receiving transmission resources of the sidelink interface allocated by a radio resource allocation management node according to the BSR.

3. The method according to claim 1,
wherein the mapping relationship between QoS parameters of the sidelink interface and logical channel group identifiers is any one or a combination of:
a mapping relationship between ProSe Per-Packet Priority, PPPP, and logical channel group identifiers;
a mapping relationship between ProSe Per-Packet Reliability, PPPR, and logical channel group identifiers;
a mapping relationship between New Radio, NR, QoS parameters and logical channel group identifiers.

4. The method according to claim 3,
wherein when the configuration information of logical channel groups of the sidelink interface is the mapping relationship between QoS parameters of the sidelink interface and logical channel group identifiers, the auxiliary information comprises all or a part of QoS parameters corresponding to each logical channel of a sidelink interface of a sidelink user equipment.

5. The method according to claim 2, wherein reporting the BSR comprises:
reporting BSRs corresponding to different wireless access technologies by using a same BSR Media Access Control Control Element, MAC CE, or reporting BSRs corresponding to different wireless access technologies respectively by using independent BSR MAC CEs.

6. The method according to claim 2, further comprising:
receiving a mapping relationship between physical resources allocated for the sidelink interface and wireless access technologies, or physical resources allocated for the sidelink interface and QoS parameters, or physical resources allocated for the sidelink interface and logical channels indicated by the resource allocation management node through sidelink interface scheduling signaling transmitted on a Uu interface or a Physical Downlink Shared Channel, PDSCH, scheduled by the sidelink interface scheduling signaling transmitted on the Uu interface.

7. A method for allocating sidelink resource, comprising:
receiving auxiliary information reported by a sidelink user equipment;
transmitting configuration information of logical channel groups of a sidelink interface to the sidelink user equipment to indicate that logical channels using different wireless access technologies correspond respectively to different logical channel groups;
receiving a Buffer Status Report, BSR, reported by the sidelink user equipment based on the configuration information of logical channel groups of the sidelink interface;
allocating transmission resources of the sidelink interface to the sidelink user equipment on physical resources corresponding to a determined wireless access technology according to a correspondence between logical channel groups and wireless access technologies;
wherein the configuration information of logical channel groups of the sidelink interface is a mapping relationship between Quality of Service, QoS, parameters of the sidelink interface and logical channel group identifiers or a mapping relationship between logical channels of the sidelink interface and logical channel group identifiers, and logical channels in a same logical channel group only correspond to a kind of wireless access technology;
when the configuration information of logical channel groups of the sidelink interface is the mapping relationship between logical channels of the sidelink interface and logical channel group identifiers, the auxiliary information comprises QoS parameters corresponding to each logical channel of a sidelink interface of a sidelink user equipment and a wireless access technology that each logical channel of the sidelink interface of the sidelink user equipment expects to use.

8. The method according to claim 7,
wherein the mapping relationship between QoS parameters of the sidelink interface and logical channel group identifiers is any one or a combination of:
a mapping relationship between ProSe Per-Packet Priority, PPPP, and logical channel group identifiers;
a mapping relationship between ProSe Per-Packet Reliability, PPPR, and logical channel group identifiers;
a mapping relationship between New Radio, NR, QoS parameters and logical channel group identifiers.

9. The method according to claim 8,
wherein when the configuration information of logical channel groups of the sidelink interface is the mapping relationship between QoS parameters of the sidelink interface and logical channel group identifiers, the auxiliary information comprises all or a part of QoS parameters corresponding to each logical channel of a sidelink interface of the sidelink user equipment.

10. The method according to claim 7, further comprising:
determining the configuration information of logical channel groups of the sidelink interface according to the auxiliary information reported by the sidelink user equipment.

11. The method according to claim 10, further comprising:
determining a mapping relationship between logical channels of the sidelink interface and logical channel group identifiers according to each logical channel identifier of the sidelink interface of the sidelink user equipment, corresponding QoS parameters, and a mapping relationship between wireless access technologies and QoS parameters.

12. The method according to claim 7, further comprising:
pre-configuring a mapping relationship between wireless access technologies and physical resources; or
determining a mapping relationship between wireless access technologies and physical resources dynamically.

13. The method according to claim 12, further comprising:
indicating a mapping relationship between physical resources allocated for the sidelink interface and wireless access technologies or QoS parameters or logical channels to the sidelink user equipment through sidelink interface scheduling signaling transmitted on a Uu interface or a Physical Downlink Shared Channel, PDSCH, scheduled by the sidelink interface scheduling signaling transmitted on the Uu interface.

14. A sidelink user equipment, comprising a processor and a memory,
wherein the processor is configured to read a program in the memory and perform the process of:
reporting auxiliary information to a resource allocation management node;
receiving configuration information of logical channel groups of a sidelink interface transmitted by the resource allocation management node, wherein the configuration information of logical channel groups of the sidelink interface is used to indicate that logical channels using different wireless access technologies correspond respectively to different logical channel groups;
determining a logical channel group corresponding to a logical channel of the sidelink interface according to the configuration information of logical channel groups of the sidelink interface;
wherein the configuration information of logical channel groups of the sidelink interface is a mapping relationship between Quality of Service, QoS, parameters of the sidelink interface and logical channel group identifiers or a mapping relationship between logical channels of the sidelink interface and logical channel group identifiers, and logical channels in a same logical channel group only correspond to a kind of wireless access technology;
when the configuration information of logical channel groups of the sidelink interface is the mapping relationship between logical channels of the sidelink interface and logical channel group identifiers, the auxiliary information comprises QoS parameters corresponding to each logical channel of a sidelink interface of a sidelink user equipment and a wireless access technology that each logical channel of the sidelink interface of the sidelink user equipment expects to use.

15. A resource allocation management node, comprising a processor and a memory, wherein the processor is configured to read a program in the memory and perform the method of claim 7.

* * * * *